(12) United States Patent
Chen et al.

(10) Patent No.: US 9,671,559 B2
(45) Date of Patent: Jun. 6, 2017

(54) INTEGRATED POLARIZATION FILTER AND TAP COUPLER

(71) Applicant: ACACIA COMMUNICATIONS INC., Maynard, MA (US)

(72) Inventors: Long Chen, Maynard, MA (US); Christopher Doerr, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/103,678

(22) Filed: Dec. 11, 2013

(65) Prior Publication Data

US 2015/0301280 A1 Oct. 22, 2015

Related U.S. Application Data

(60) Provisional application No. 61/735,728, filed on Dec. 11, 2012.

(51) Int. Cl.
*G02B 6/126* (2006.01)
*H04B 10/60* (2013.01)
*G02B 6/12* (2006.01)

(52) U.S. Cl.
CPC ............. *G02B 6/126* (2013.01); *H04B 10/60* (2013.01); *G02B 2006/1215* (2013.01); *G02B 2006/12147* (2013.01)

(58) Field of Classification Search
CPC .................. G02B 6/126; G02B 6/2843
See application file for complete search history.

(56) References Cited

U.S. PATENT DOCUMENTS

| | | | | |
|---|---|---|---|---|
| 5,125,050 A | * | 6/1992 | Deri | G02B 6/12004 |
| | | | | 257/E31.061 |
| 5,799,120 A | * | 8/1998 | Kurata | G02B 6/12007 |
| | | | | 385/14 |
| 7,822,298 B2 | * | 10/2010 | Rasras | G02B 6/126 |
| | | | | 385/1 |
| 9,091,813 B2 | * | 7/2015 | Dallesasse | G02B 6/26 |
| 2003/0026558 A1 | * | 2/2003 | Miyata | G02B 6/126 |
| | | | | 385/110 |
| 2004/0247239 A1 | * | 12/2004 | Eldada | G02B 6/12007 |
| | | | | 385/27 |

* cited by examiner

*Primary Examiner* — Omar R Rojas
(74) *Attorney, Agent, or Firm* — Wolf, Greenfield & Sacks, P.C.

(57) ABSTRACT

Disclosed herein are methods, structures, apparatus and devices to integrate polarization filters and power tap couplers on planar photonic circuits that advantageously provide a lower insertion loss to an optical signal and improved optical bandwidth as compared with contemporary designs wherein these two functions are implemented separately.

9 Claims, 5 Drawing Sheets

INTEGRATED POLARIZATION FILTER AND TAP COUPLER

CROSS REFERENCE TO RELATED APPLICATIONS

This application claims the benefit of U.S. Provisional Patent Application Ser. No. 61/735,728 filed Dec. 11, 2012 which is incorporated by reference in its entirety as if set forth at length herein.

TECHNICAL FIELD

This disclosure relates generally to optical communications. More particularly, this disclosure pertains to techniques, methods, apparatus, structures and materials for integrating a polarization filter and tap coupler as part of a photonic integrated circuit.

BACKGROUND

Contemporary optical communications and other photonic systems make extensive use of planar photonic integrated circuits, polarization filters, and tap couplers. Accordingly, techniques, methods, apparatus and structures that improve or provide for their integration would represent a welcome addition to the art.

SUMMARY

An advance in the art is made according to an aspect of the present disclosure directed to techniques, methods, apparatus, structures and materials to integrate polarization filters and power tap couplers on planar photonic circuits that advantageously provide a lower insertion loss to an optical signal and improved optical bandwidth as compared with contemporary designs wherein these two functions are implemented separately.

In a particular embodiment, an apparatus according to the present disclosure comprises a first directional coupler and a second directional coupler in series with the first directional coupler; wherein said first and second directional coupler are configured such that when light having first and second polarization states is applied to an input of the first directional coupler, light comprising substantially the first polarization state is output from a first output of the first directional coupler, while light comprising substantially the second polarization state is output from a second output of the first directional coupler and directed to an input of the second directional coupler such that light comprising substantially the second polarization state is output from a first output of the second directional coupler and light comprising substantially the second polarization state is output from a second output of the second directional coupler.

With this infirmity in mind, we note that one aspect of the present disclosure provides a significantly simplified configuration—where the extinction ratios of all modulators within the group are controlled jointly—in sharp contrast to those configuration(s) wherein all modulators are individually controlled.

BRIEF DESCRIPTION OF THE DRAWING

A more complete understanding of the present disclosure may be realized by reference to the accompanying drawings in which.

DETAILED DESCRIPTION

Figure 1:
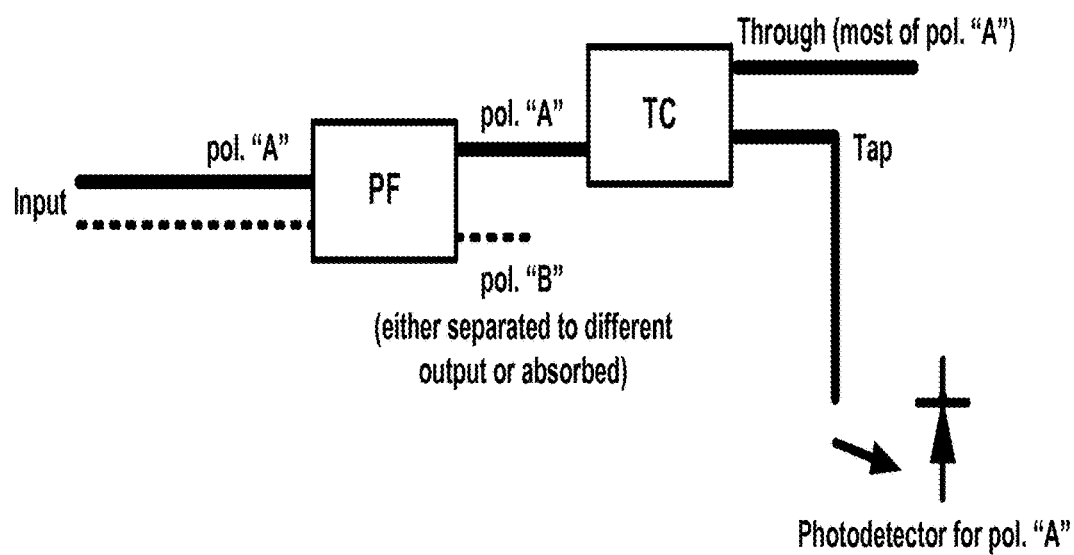
FIG. 1 shows a schematic illustration of conventional configuration for a polarization filter (PF) and a tap coupler (TC) wherein the total insertion loss for the primary signal polarization (pol. 'A') is the combined loss of both blocks.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we note that photonic integrated circuits (PICs) oftentimes require polarization filters to eliminate light of undesired polarizations in certain portions of the circuits. Examples of such situations are abundant. In polarization-diversified circuits, an incoming signal containing two orthogonal polarizations is separated by a polarization beam splitter into individual paths, but the polarization extinction ratio might not be sufficient (in some cases an extinction ratio up to 40 dB might be needed). In another example, certain optical components (such as directional couplers) may introduce small amount of polarization rotation due—in part—to breaking of the waveguide symmetry, and the generated polarization component might be detrimental to the circuit performances. Finally, polarization rotators are sometimes used to convert the optical signal from one polarization to the other polarization. Unfortunately the conversion efficiency usually is not high enough to suppress the input polarization sufficiently (20 dB suppression translates to 99% conversion efficiency). In each of the above cases, polarization clean-up filters can be inserted to remove the undesired polarization component and ensure a sufficiently pure signal is sent to a downstream optical circuit. Such clean-up filters add a certain amount of loss to the optical path.

Oftentimes, photonic integrated circuits need power monitors to track the amount of optical power in the circuits. As an alternative to power monitors, tap couplers may be used to extract a small percentage (1 to 10%) of the optical signal from an optical path and the extracted light is directed to either integrated or external photodiodes.

We now turn to FIG. 1 which depicts in schematic form a conventional way of implementing these two (polarization filter/tap coupler) functions. As depicted in FIG. 1 two independent blocks are shown—one for the polarization filter (PF) and one for the tap coupler (TC)—arranged sequentially.

Assuming that the signal at input exhibits a polarization 'A' as the primary signal polarization and a polarization 'B' as the undesired polarization, the polarization filter (PF) "cleans out" polarization 'B' by separating it to a different output, scattering it away, absorbing it, or any other mechanisms. Subsequently, a tap coupler (TC) extracts a certain amount of light from the remaining polarization "A" signal and directs the extracted light to a photodetector. Untapped light is directed to a "Through" port. Since the primary signal goes through both blocks, the total insertion loss of the circuit from the input port to the final through port is thus the combined insertion loss of both blocks.

Figure 2:
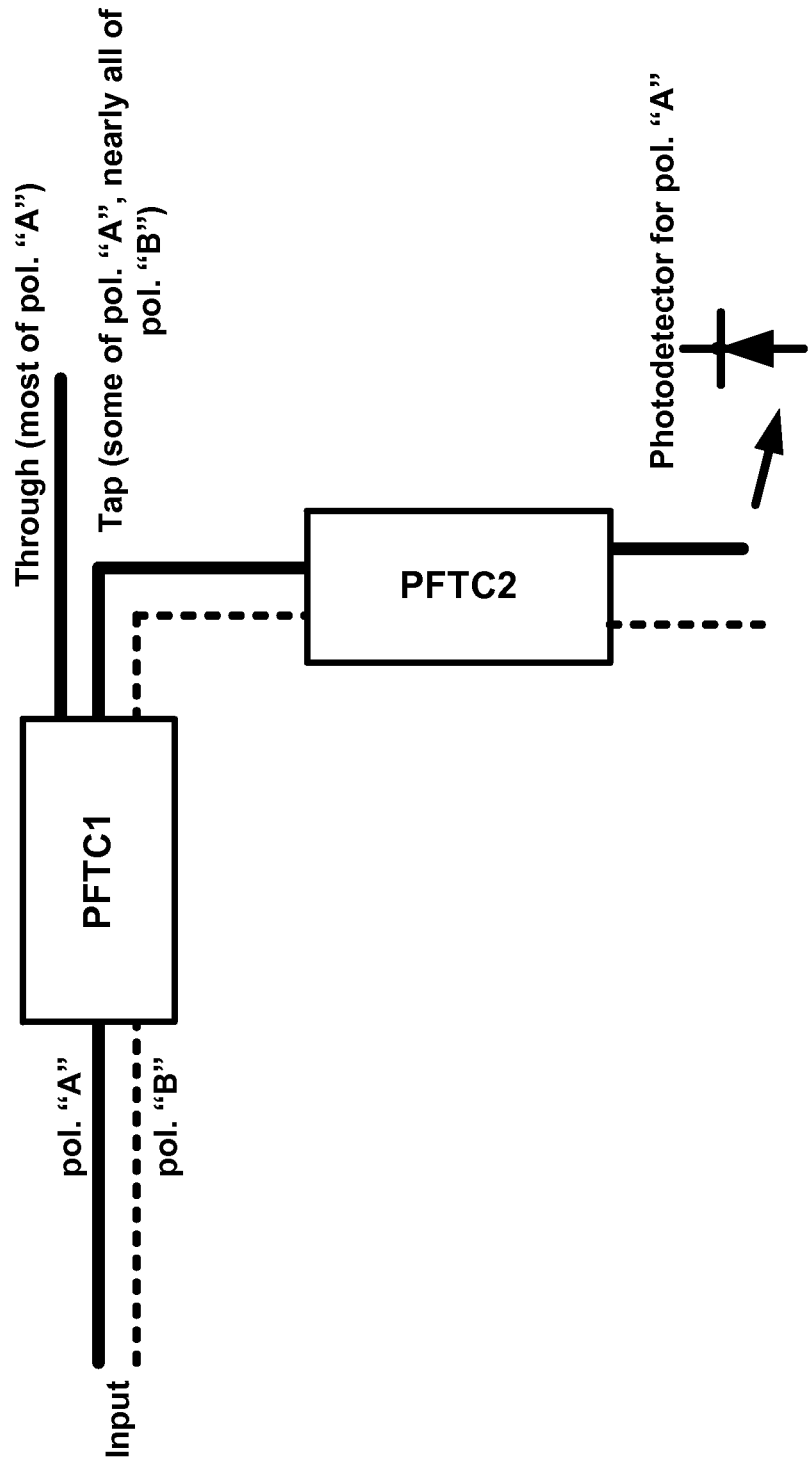
FIG. 2 shows a schematic illustration of an integrated design of the polarization filter and power tap according to the present disclosure that exhibits lower insertion loss than the conventional design.

With this background in place, we may now describe a configuration according to the present disclosure that advantageously integrates a polarization filter and tap coupler such that the overall structure exhibits a lower optical insertion loss and better optical bandwidth for the primary signal. FIG. 2 shows an exemplary embodiment of such a configuration according to an aspect of the present disclosure.

As depicted therein, a box labeled "PFTC" (polarization filter & tap coupler) includes a polarization beam splitter with limited polarization extinction ratio for at least one of the two output ports (the 'tap' port). Most of polarization 'A' is sent to the 'through' port, and a small percentage of that is sent to the 'tap' port. Nearly all of polarization 'B' is "cleared out" from the 'through' port. This polarization can be absorbed, scattered away, or sent to the tap port. If the polarization 'B' is indeed sent to the tap port, then another polarization filter or PFTC can be optionally added after the tap port to remove it before a monitoring photodetector so that only the power of the desired signal polarization is measured. Since the optical path from the input port to the through port only goes through one device, the insertion loss may advantageously be lower than the conventional configuration shown previously in FIG. 1. And while the tap port may experience some added loss associated with the second stage PTFC2, that additional loss may be easily accommodated with proper power calibration.

Figure 3:
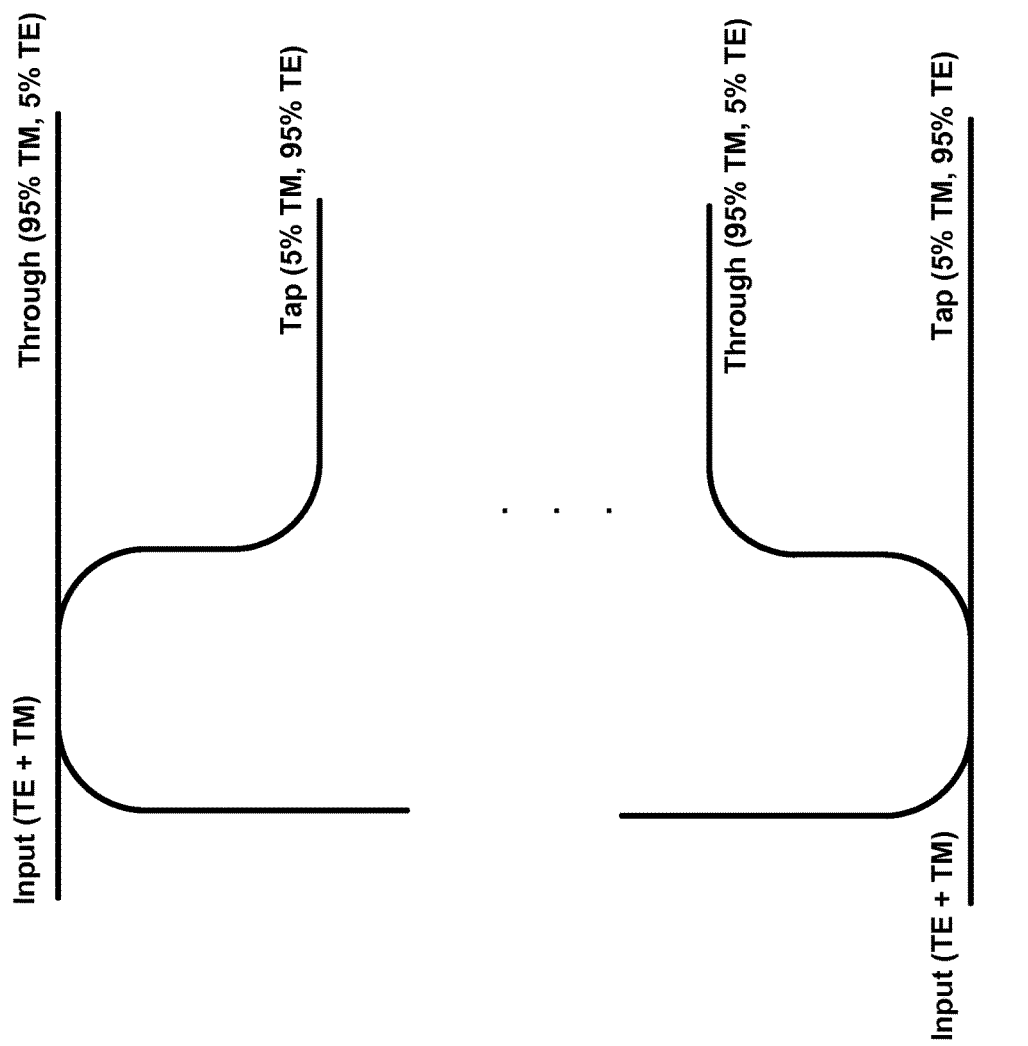
FIG. 3 shows a schematic illustration of an exemplary integrated polarization filter and tap coupler (PFTC) with properly designed directional couplers, for a primary signal polarization of TE (left panel) and TM (right panel), respectively according to an aspect of the present disclosure.

Turning now to FIG. 3, there it shows in schematic form examples of a PFTC comprising a properly designed directional coupler. The top panel is a configuration (design) wherein the primary signal polarization is the transverse electric (TE) polarization. The bottom panel is a configuration wherein the primary signal polarization is the transverse magnetic (TM) polarization. Such configurations advantageously exploit the strong mode birefringence of the waveguides.

The distribution of optical power among the two output ports (Trough port and Tap port) can be drastically different for the two polarizations. For the first case depicted in the top panel, one can design a device so that the undesired TM polarization is almost completely filtered out (Tapped out) from the through port. The amount of TE signal polarization extracted to the tap port can also be adjusted by selective design. As depicted herein, an example of 5% tap is shown.

For the second case shown in the bottom panel, the arrangement of the through and tap ports are flipped as compared with the top panel. One can design for example 95% of the TM signal together with 5% of undesired TE polarization going to the through port, and 5% of the TM signal and most of the undesired TE polarization going to the tap port.

Figure 4:
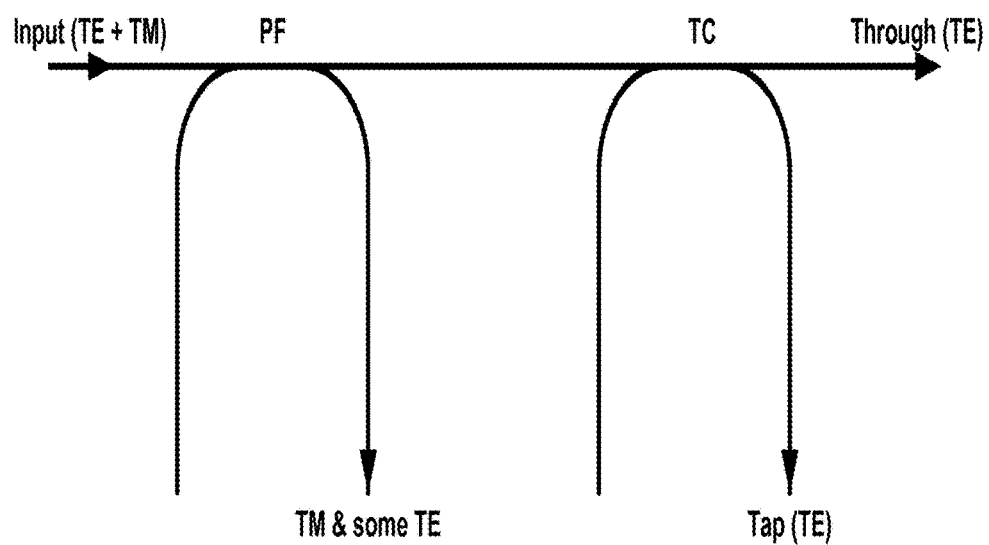
FIG. 4 shows a schematic illustration of a contemporary implementation of a polarization filter and tap coupler functions using conventional design(s)
Figure 5:
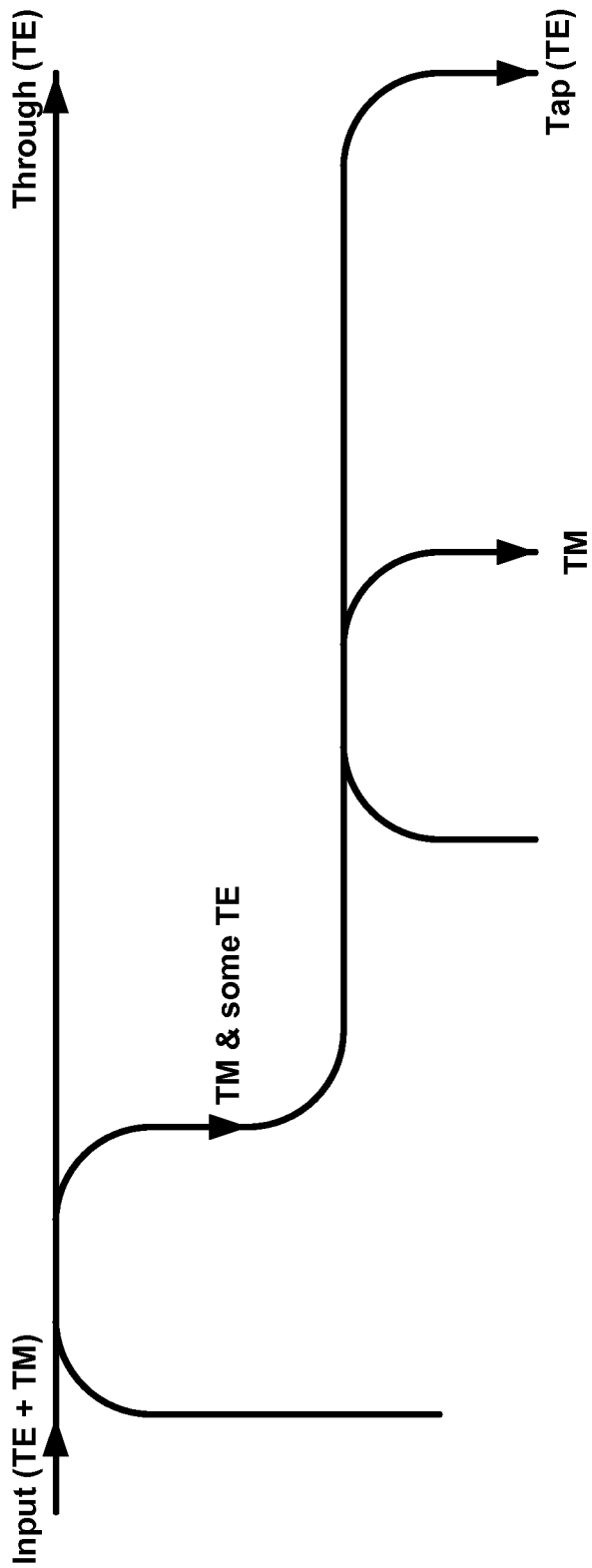
FIG. 5 shows a schematic illustration of an exemplary implementation of polarization filter and tap coupler according to an aspect of the present disclosure.

FIG. 4 and FIG. 5 each show in schematic form examples of using directional couplers to implement the functions of polarization filter and tap coupler for a primary signal polarization of TE. With respect to the example depicted in FIG. 4, therein it is arranged using a conventional design in which a tap coupler sequentially follows a polarization filter. The example depicted in FIG. 5 is arranged using a configuration according to the present disclosure. An input optical mode (Input (TE+TM)) is input to the first directional coupler. One waveguide of the first directional coupler outputs a second optical mode (Through (TE)), and a second waveguide of the first directional coupler outputs a third optical mode (TM & some TE) to a second directional coupler, which outputs on a third waveguide a further optical mode (Tap (TE)) and on a fourth waveguide a fourth optical mode (TM).

As may be appreciated, design according to the present disclosure exhibits a lower insertion loss for the through port signal as compared to the conventional design. While this improvement may appear to be small at a particular optical wavelength based on the example shown in FIG. 3, as the wavelength deviates away from the center wavelength for which the directional coupler is designed for, the insertion loss of the directional coupler increases quickly and the improvement becomes more and more significant.

Another way of interpretation is that since each directional coupler has a limited optical bandwidth, the proposed new design has a large optical bandwidth since it only goes through one stage of directional coupler in the through path, compared to two stages in the conventional design. This improvement can be significant when broad bandwidth coverage, for example, the full C-band or C+L band, is required. It is true that the conventional arrangement has a better polarization extinction ratio for the through port due to the cascading effect. However, in many applications only a small amount of undesired polarization is presented in the input signal and the polarization extinction ratio of a single stage in the proposed arrangement is already sufficient.

At this point, those skilled in the art will readily appreciate that while the methods, techniques and structures according to the present disclosure have been described with respect to particular implementations and/or embodiments, those skilled in the art will recognize that the disclosure is not so limited. In particular, embodiments according to the present disclosure may advantageously be integrated together onto a single substrate. Accordingly, the scope of the disclosure should only be limited by the claims appended hereto.

The invention claimed is:

1. An optical apparatus comprising:
   a first directional coupler having a first waveguide and a second waveguide;
   a second directional coupler having a third waveguide and a fourth waveguide such that the third waveguide is optically connected with the second waveguide of the first directional coupler;
   a photodiode optically connected with an end of the third waveguide of the second directional coupler;
   wherein the first directional coupler is configured to, in response to receiving an input signal having a first polarization and a second polarization, output onto the second waveguide a first optical mode having the first polarization and the second polarization;
   wherein the second directional coupler is configured to output a second optical mode having a majority of the first polarization onto the third waveguide; and
   wherein the third waveguide and the fourth waveguide are not optically coupled to the first waveguide.

2. The optical apparatus of claim 1, wherein the first directional coupler and the second directional coupler are integrated together onto a single substrate.

3. The optical apparatus of claim 1, wherein the first polarization is a TE polarization and the second polarization is a TM polarization.

4. The optical apparatus of claim 1, wherein the first polarization of the second optical mode is between 1% and 10% of the first polarization of the input signal.

5. The optical apparatus of claim 4, wherein the first polarization of the second optical mode is between 5% and 10% of the first polarization of the input signal.

6. An optical apparatus comprising:
   an input port, a first output port, a second output port and a third output port;
   a first coupler having a first waveguide and a second waveguide, wherein the first waveguide is optically connected between the input port and the first output port;
   a second coupler optically connecting the second output port to the second waveguide of the first coupler, and the third output port to the second waveguide of the first coupler;
   a photodiode optically connected with the second output port;
   wherein the first coupler is configured to, in response to receiving an input signal having a first polarization and a second polarization through the input port, output to the first output port a third optical mode having primarily the first polarization and to output to the second coupler a first optical mode having the first polarization and the second polarization;
   wherein the second coupler is configured to, in response to receiving the first optical mode through the first coupler, output a fourth optical mode having primarily the second polarization to the third output port and to output a second optical mode having primarily the first polarization to the second output port; and
   wherein the first polarization of the second optical mode is between 1% and 10% of the first polarization of the input signal.

7. The optical apparatus of claim 6, wherein the first polarization is a TE polarization and the second polarization is a TM polarization.

8. The optical apparatus of claim 6, wherein the first polarization of the second optical mode is between 5% and 10% of the first polarization of the input signal.

9. The optical apparatus of claim 6, wherein the first coupler and the second coupler are integrated together onto a single substrate.

* * * * *